(12) United States Patent
Shumkov et al.

(10) Patent No.: US 8,390,337 B2
(45) Date of Patent: Mar. 5, 2013

(54) ELECTRONIC DEVICE AND METHOD FOR DC-DC CONVERSION

(75) Inventors: Ivan Shumkov, Freising (DE); Erich Bayer, Thonhausen (DE)

(73) Assignee: Texas Instruments Deutschland GmbH, Freising (DE)

( * ) Notice: Subject to any disclaimer, the term of this patent is extended or adjusted under 35 U.S.C. 154(b) by 205 days.

(21) Appl. No.: 12/900,278

(22) Filed: Oct. 7, 2010

(65) Prior Publication Data

US 2011/0089993 A1 Apr. 21, 2011

(30) Foreign Application Priority Data

Oct. 16, 2009 (DE) .................... 10 2009 049 615

(51) Int. Cl.
*H03K 3/00* (2006.01)
(52) U.S. Cl. ....................... 327/108; 327/112
(58) Field of Classification Search ........... 327/108–112
See application file for complete search history.

(56) References Cited

U.S. PATENT DOCUMENTS

| | | | |
|---|---|---|---|
| 5,023,474 A * | 6/1991 | Wilcox ................ | 327/109 |
| 5,371,418 A | 12/1994 | Leipold et al. | |
| 5,933,034 A * | 8/1999 | Hastings et al. ........... | 327/108 |
| 5,945,872 A | 8/1999 | Robertson et al. | |
| 6,885,225 B2 * | 4/2005 | Ohmichi et al. ........... | 327/112 |
| 6,977,533 B2 * | 12/2005 | Kernhof et al. ........... | 327/110 |
| 7,504,868 B2 * | 3/2009 | Bodano et al. ........... | 327/108 |

FOREIGN PATENT DOCUMENTS

DE 19950022 12/2001

OTHER PUBLICATIONS

DE Search Report dated May 4, 2010.

\* cited by examiner

*Primary Examiner* — Kenneth B. Wells
(74) *Attorney, Agent, or Firm* — William B. Kempler; Wade J. Brady, III; Frederick J. Telecky, Jr.

(57) ABSTRACT

An electronic device for driving a power switch coupled to receive a first supply voltage level at one side of its channel is provided. The electronic device includes a control switch coupled with a first side of a channel to receive a varying control voltage having a maximum level that is greater than a maximum voltage level of the first voltage supply and with another side of the channel to a control gate of the power switch for selectively applying the control voltage to the control gate of the power switch. The first side of the channel is coupled with the control gate of the control switch and a capacitor is provided and coupled with a first side to the control gate of the control switch and with a second side to a constant voltage supply.

18 Claims, 1 Drawing Sheet

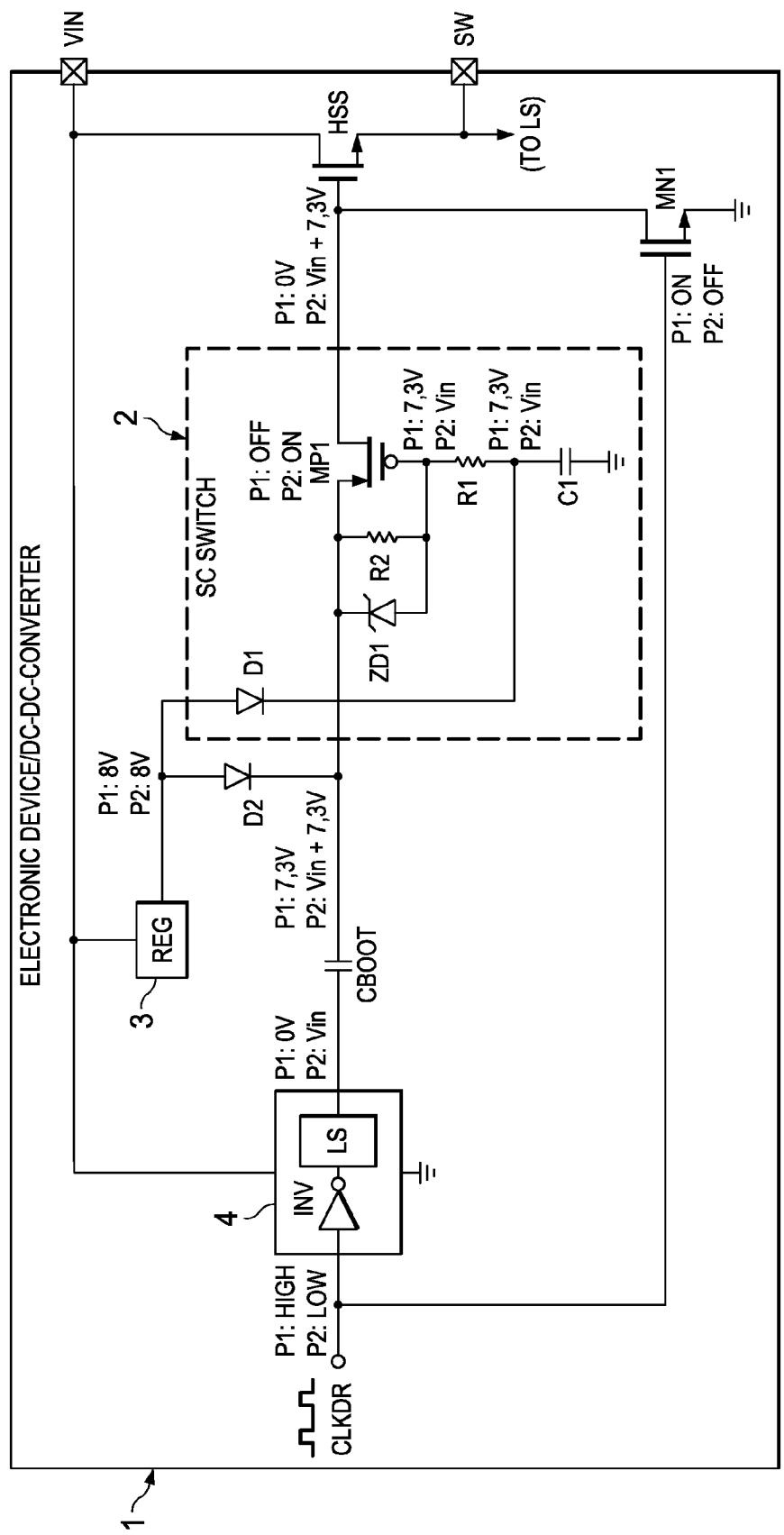

ELECTRONIC DEVICE AND METHOD FOR DC-DC CONVERSION

CROSS-REFERENCE TO RELATED APPLICATIONS

This patent application claims priority from German Patent Application No. 10 2009 049 615.7, filed Oct. 16, 2009, which is incorporated herein by reference in its entirety.

FIELD OF THE INVENTION

The invention relates to an electronic device and a method for DC-DC conversion, and more specifically to a circuitry for driving a power switch.

BACKGROUND OF THE INVENTION

DC-DC converters use one or more switches for converting an input voltage level into an output voltage level. In buck DC-DC converters, one of the switches may be coupled to the input power supply. This switch is referred to as the high-side switch (HSS). If the high-side switch is an NMOS transistor, the voltage level at the control gate of the transistor must be greater than the input voltage level in order to turn the switch on. Such a high control voltage level is usually generated with a bootstrap circuit. Furthermore, there can be a control transistor coupled between the output node of the bootstrap circuit and the control gate of the high-side switch. This control transistor requires a complex active gate driver circuit for turning the control transistor on and off. Furthermore, the voltage levels at the drain, source and gate of the control transistor must comply with the limitations of the used technology. If the high-side switch is driven with signals of a rather high switching frequency, the timing of the signals for the transistors can be demanding.

SUMMARY OF THE INVENTION

A general object of the invention is to provide an electronic device for DC-DC conversion and a method which are less complex and have a better timing than prior art circuits and methods.

According to an aspect of the invention, an electronic device is provided for driving a power switch of a DC-DC converter. The power switch can be the high-side switch of a buck DC-DC converter and it may be an NMOS transistor. The power switch may be coupled to a first voltage supply with one side of its channel. There can be a control switch coupled to receive a varying control voltage level at a first side of its channel. The maximum voltage level of the varying control voltage may then be greater than a maximum voltage level of the first voltage supply. The first voltage supply may be an input voltage supply of the buck DC-DC converter configuration. In order to receive such a high control voltage level, the control switch may be coupled with the first side of its channel to a bootstrap circuit. The control switch may be coupled with a second side of its channel to a control gate of the power switch for selectively feeding the control voltage to the control gate of the power switch. The first side of the channel and the control gate of the control switch may then be coupled together. A capacitor may be provided and coupled with a first side to the control gate of the control switch and with a second side to a constant voltage supply (for example ground level). According to this aspect of the invention, a very simple mechanism is provided for switching a control switch and for applying a high-voltage level to the control gate of the power switch. The capacitive voltage divider between the capacitor and a parasitic capacitance of the transistor (for example the source gate voltage of the high-side switch) allows high-voltage levels to be switched. If the first side of the channel of the control switch is the source of a PMOS transistor, extremely fast switching is possible as the control transistor is driven from the source side. The gate of the control switch can be assumed to be AC (alternate current, small signal equivalent) grounded. The switching moment of the control transistor is exactly and inherently synchronized with, for example, the bootstrap circuit used for generating the varying control signal levels. The control transistor does not require an additional bootstrap circuit. The energy stored on the capacitor may be automatically transferred back to the first side of the channel of the control transistor. The bootstrap circuit on the first side of the channel of the control switch does not have a DC load.

According to another aspect of the invention, a diode may be provided which may be coupled with a cathode to the first side of the channel and with an anode to the control gate of the control switch. This provides that the node between the control gate of the control switch and the capacitor can be quickly discharged.

A first resistor may be coupled between the control gate of the control switch and the first side of the capacitor. This first resistor may be configured to limit a current through the diode from the node between the capacitor and the control gate of the control switch and the first side of the channel.

The diode may be a Zener diode. The Zener diode may then have a breakthrough voltage equal to or lower than the maximum admissible voltage drop between the first side of the channel and the control gate of the control switch. The Zener diode may have a breakthrough voltage that corresponds to the maximum admissible source gate voltage of the control switch.

In another embodiment, a series of diodes may be coupled between the first side of the channel and the control gate in forward biased direction. The series of diodes may be configured to provide the voltage drop between the first side of the channel and the control gate of the control switch equal to or lower than the maximum admissible voltage drop between the first side of the channel and the control gate of the control switch. This can be an alternative implementation to using a Zener diode.

In another aspect of the invention, the breakthrough voltage across the Zener diode or alternatively the voltage drop across the series of diodes can be chosen to have the same magnitude as a constant output voltage of a voltage regulator minus a diode forward voltage drop. This can be useful to generate and apply voltage levels to all nodes of the control transistor (for example source, drain and control gate) which does not result in a voltage difference greater than a maximum admissible voltage level for the control transistor.

According to another aspect of the invention, a second resistor may be coupled between the control gate of the control switch and the first side of the channel. This second resistor may be configured to ensure that the control switch is off in DC operation. The resistance value of the first resistor may then be much smaller than the resistance value of the second resistor. The second resistor may have a resistance value of about 100 kΩ to several hundreds of kΩs. The first resistor may have resistance values in the range of tens of Ohms up to several hundreds of Ohms. Furthermore, a diode may be coupled to receive a second supply voltage level at an anode. The cathode of the diode may be coupled to the first side of the capacitor. This provides that the first side of the capacitor can be charged to a predefined voltage level. This voltage level may be generated by a voltage generator which is coupled to the first power supply.

The invention also provides a method of driving a power switch of a DC-DC converter. A control voltage level can be selectively applied to a control gate of the power switch. The control gate may then be capacitively coupled to a constant supply voltage level.

BRIEF DESCRIPTION OF DRAWING

Further aspects of the invention will ensue from the description herein below of preferred embodiments of the invention with reference to the accompanying drawings, wherein:

FIG. 1 is a simplified circuit diagram of an embodiment of the invention.

DESCRIPTION OF THE EMBODIMENTS

FIG. 1 shows an electronic device 1 for DC-DC conversion which is implemented in accordance with various aspects of the invention. There is a power switch HSS, which is coupled with a drain to a first power supply and with a source to a switching node SW. The architecture shown may relate to a buck DC-DC converter and the power switch can be the high-side switch of the DC-DC converter. The first voltage supply may then be the input voltage of the buck converter. In this embodiment, the high-side switch is an NMOS transistor. The switching node SW may be coupled to another power switch or a diode (not shown). An inductor may then be coupled to the switching node SW for providing the output voltage of the DC-DC conversion to an output node (also not shown). The input power supply may have an input power level of 20 V, or more. There is a voltage regulator REG 3 for generating a constant supply voltage level of 8 V. In this embodiment, the constant supply voltage level of 8 V corresponds to the maximum gate source voltage VGS of the NMOS switch. When the capacitor CBOOT is charged, the negative node of CBOOT is grounded. Therefore the output voltage of the voltage regulator REG 3 is also the voltage level on CBOOT at the end of the charging cycle. If the capacitance of CBOOT is much greater than the effective input capacitance of the power NMOS, CBOOT only loses a small percentage (for example 10% to 20%) of its voltage when it is discharged to the gate of the power NMOS. Therefore, the regulator REG 3 defines the average bias voltage of CBOOT and the gate to source voltage of the power NMOS. A clock driving signal CLKDR is received from a gate driver stage or a control logic for generating suitable driving signals for the high-side switch. The clock-driving signal CLKDR is fed to a stage 4 that may include an inverter INV and a level shifter LS. Stage 4 receives typical low-voltage logic signals which drive the levels and provide a respective signal at a higher voltage level, i.e. between 0V and VIN. In order to further increase the maximum positive voltage levels, a bootstrap circuit is provided including a capacitor CBOOT and a diode D2. Capacitor CBOOT is coupled between the output of stage 4 and a first side of the channel of a control transistor MP1. This first side of the channel is the source of transistor MP1. The second side of the channel, i.e., the drain of MP1, is coupled to the control gate of the power switch HSS. The control transistor MP1 serves to transfer the high control voltage levels to the control gate of the high-side switch. This requires that the control gate of the control transistor MP1 receive voltage levels which are high enough to accommodate the voltage levels for the power switch. The maximum admissible voltage levels are limited by technology constraints such as the maximum gate source or gate drain voltage and the required timing and operation of the control transistor MP1. A capacitor C1 is coupled to ground (a constant supply voltage level) and with the other side to a resistor R1. Resistor R1 is coupled to the control gate of the control transistor MP1. Furthermore, the control gate of the control transistor MP1 is coupled through transistor R2 and Zener diode ZD1 to the source of the control transistor MP1. The components Z1, R1, R2 and ZD1 provide that the control gate of the control transistor MP1 always receives the required control voltage levels with the exact timing. Resistor R2 is only required if no Zener diode is available in a technology. A standard diode may be used instead of ZD1 and the resistive divider of R1 and R2 may be dimensioned to limit the gate source voltage of MP1.

There are two phases or periods of a clock signal referred to as P1 (first phase) and P2 (second phase). The respective voltage levels at some of the nodes are also indicated with a reference to the respective phase. The clock drive signal CLKDR is logic high during phase P1 and logic low during phase P2. The respective states at the output of the level shifter 4 are 0 V during phase P1 and VIN during phase P2. These signals are applied to a first side of the bootstrap capacitor CBOOT. The second side of the bootstrap capacitor is charged to 7.3 V through diode D2 during the first phase P1. If the first side is raised to VIN, the second side assumes a voltage level of VIN+7.3V, which is greater (more positive) than the voltage level of the input supply voltage VIN. The voltage levels at the second side of the bootstrap capacitor CBOOT are fed to the source of the control transistor MP1. MP1 is turned on in phase P1 and off during phase P2. The control gate of the control transistor MP1 has a voltage level of 7.3 V during the first phase P1. This is due to diode ZD1, resistor R2 and resistor R1. The capacitor C1 is charged to 7.3 V during phase P1. This is performed through diode D1 which is coupled to the voltage regulator 3 for receiving a constant voltage of 8 V at its anode. The cathode is coupled to the first side of capacitor C1. The second side of capacitor remains at the same constant voltage level during both phases P1 and P2. However, if the voltage level on the node between the bootstrap capacitor CBOOT and the source of the control transistor MP1 rises to VIN+7.3 V during the second phase P2, the first side of the capacitor C1 is charged to VIN. This is due to the breakthrough voltage of the Zener diode ZD1 which is assumed to be 7.3 V. In this embodiment the voltage drop across the Zener diode is about the same as the voltage level supplied from the voltage regulator (8 V in this example) minus the forward voltage drop across diodes D1 and D2 (i.e. 0.7 V in this example). However, the Zener diode ZD1 primarily serves to limit the gate to source voltage of transistor MP1 and does not need to match with the output voltage of regulator REG 3. The voltage at the drain of the control transistor and at the control gate of the power switch HSS is then VIN+7.3 V during the second phase P2 and 0 V during the first phase P1. This means that the power switch is completely turned on (very small ON-resistance) during the second phase P2 and completely turned off during the first phase. The voltage on the control gate of the power switch HSS is pulled down through transistor MN1 during the first phase P1. Transistor MN1 can be driven with the normal logic levels of driving signal CLKDR. MN1 is turned off during the second phase P2. Furthermore, the Zener diode ZD1 provides that the control gate of the control transistor is quickly discharged at the beginning of the first phase P1 to the voltage level at the source of the control transistor MP1. This provides that transistor MP1 is turned off during phase P1. Resistor R2 basically serves to completely discharge the control gate for slow frequencies or DC states. The first resistor R1 limits the current through the Zener diode ZD1 in forward direction.

The circuit, according to this embodiment, provides that the voltage drops between source and gate and drain and gate of the control transistor MP1 never exceed 7.3 V. Furthermore, the timing for the control signals for transistor MP1 is inherently correct. A bootstrap circuit for driving the control gate is not required.

The embodiment shown in FIG. 1 relates to buck converter configuration. However, the principles and aspects of the invention may also be applied to other types of DC-DC converters without departing from the invention.

Although the present invention has been described in detail, it should be understood that various changes, substitutions and alterations can be made thereto without departing from the spirit and scope of the invention as defined by the appended claims.

The invention claimed is:

1. An electronic device for driving a power switch coupled to receive a first supply voltage level at one side of its channel, the electronic device comprising:
a control switch coupled with a first side of a control switch channel to receive a varying control voltage having a maximum level that is greater than a maximum voltage level of the first voltage supply and with another side of the channel to a control gate of the power switch for selectively applying the control voltage to the control gate of the power switch; and
a diode coupled with a cathode to the first side of the control switch channel and with an anode to the control gate of the control switch,
wherein the first side of the control switch channel is coupled with a control gate of the control switch and a biasing capacitor is provided and coupled with a first side to the control gate of the control switch and with a second side to a constant voltage supply.

2. The electronic device according to claim 1, wherein the diode is a Zener diode having a breakthrough voltage equal to or lower than the maximum admissible voltage drop between the first side of the channel and the control gate of the control switch.

3. The electronic device according to claim 1, further comprising a series of diodes coupled between the first side of the channel and the control gate in forward biased direction and being configured to provide a voltage drop between the first side of the channel and the control gate of the control switch equal to or lower than the maximum admissible voltage drop between the first side of the channel and the control gate of the control switch.

4. The electronic device according to claim 1, further comprising a first resistor coupled between the control gate of the control switch and the first side of the capacitor.

5. The electronic device according to claim 4, further comprising a second resistor coupled between the control gate of the control switch and the first side of the channel being configured to close the control switch in DC operation.

6. The electronic device according to claim 1, further comprising a diode coupled to receive a second supply voltage level at an anode and being coupled with a cathode to the first side of the capacitor.

7. The electronic device according to claim 1, further comprising a diode coupled to receive a second supply voltage level at an anode and being coupled with a cathode to the first side of the channel of the control switch.

8. A method of driving a power switch of a DC-DC converter, the method comprising:
selectively applying a maximum voltage level of a control voltage that is greater than a maximum level of a first voltage supply to a control gate of the power switch with a control switch coupled with a channel to the control gate of the power switch;
wherein a control gate of the control switch is coupled to a first side of a biasing capacitor which is coupled with a second side to a constant voltage supply;
coupling the channel of the control switch to a bootstrap capacitor for receiving a control signal from the bootstrap capacitor and wherein the biasing of the gate of the control switch is set by an RC passive network, including the biasing capacitor.

9. The method of claim 8, wherein the control switch is a PMOS transistor having its source coupled to a positive node of the bootstrap capacitor.

10. An electronic device for driving a power switch coupled to receive a first supply voltage level at one side of its channel, the electronic device comprising:
a control switch coupled with a first side of a control switch channel to receive a varying control voltage having a maximum level that is greater than a maximum voltage level of the first voltage supply and with another side of the channel to a control gate of the power switch for selectively applying the control voltage to the control gate of the power switch;
wherein the first side of the control switch channel is coupled with a control gate of the control switch and a biasing capacitor is provided and coupled with a first side to the control gate of the control switch and with a second side to a constant voltage supply, and wherein the channel of the control switch is coupled to a bootstrap capacitor for receiving a control signal from the bootstrap capacitor and wherein the biasing of the gate of the control switch is set by an RC passive network, including the biasing capacitor.

11. The device of claim 10, wherein the control switch is a PMOS transistor having its source coupled to a positive node of the bootstrap capacitor.

12. The electronic device according to claim 10, further comprising a diode coupled with a cathode to the first side of the control switch channel and with an anode to the control gate of the control switch.

13. The electronic device according to claim 10, wherein the diode is a Zener diode having a breakthrough voltage equal to or lower than the maximum admissible voltage drop between the first side of the channel and the control gate of the control switch.

14. The electronic device according to claim 10, further comprising a series of diodes coupled between the first side of the channel and the control gate in forward biased direction and being configured to provide a voltage drop between the first side of the channel and the control gate of the control switch equal to or lower than the maximum admissible voltage drop between the first side of the channel and the control gate of the control switch.

15. The electronic device according to claim 10, wherein the RC passive network comprises a first resistor coupled between the control gate of the control switch and the first side of the capacitor.

16. The electronic device according to claim 15, further comprising a second resistor coupled between the control gate of the control switch and the first side of the channel being configured to close the control switch in DC operation.

17. The electronic device according to claim 10, further comprising a diode coupled to receive a second supply voltage level at an anode and being coupled with a cathode to the first side of the capacitor.

18. The electronic device according to claim 10, further comprising a diode coupled to receive a second supply voltage level at an anode and being coupled with a cathode to the first side of the channel of the control switch.

* * * * *